(12) United States Patent
Nellore et al.

(10) Patent No.: US 11,949,943 B2
(45) Date of Patent: Apr. 2, 2024

(54) GAZE-RESPONSIVE ADVERTISEMENT

(71) Applicant: ARRIS Enterprises LLC, Suwanee, GA (US)

(72) Inventors: Anil Kumar Nellore, Bangalore (IN); Krishna Prasad Panje, Bangalore (IN); Jeyakumar Barathan, Bangalore (IN); Chandrashekar Ksheerasagar, Bangalore (IN); Swaroop Mahadeva, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 16/512,784

(22) Filed: Jul. 16, 2019

(65) Prior Publication Data

US 2020/0045363 A1 Feb. 6, 2020

Related U.S. Application Data

(60) Provisional application No. 62/698,741, filed on Jul. 16, 2018.

(51) Int. Cl.
*H04N 21/431* (2011.01)
*H04N 21/4223* (2011.01)
(Continued)

(52) U.S. Cl.
CPC ..... *H04N 21/4318* (2013.01); *H04N 21/4223* (2013.01); *H04N 21/44218* (2013.01); *H04N 21/812* (2013.01)

(58) Field of Classification Search
CPC .......... H04N 21/4318; H04N 21/4223; H04N 21/44218; H04N 21/812
See application file for complete search history.

(56) References Cited

U.S. PATENT DOCUMENTS

| 9,454,225 B2 | 9/2016 | Bychkov et al. |
| 2003/0028873 A1* | 2/2003 | Lemmons ......... H04N 7/17318 725/36 |

(Continued)

FOREIGN PATENT DOCUMENTS

| WO | 2011/008236 A1 | 1/2011 |
| WO | 2015/168122 A1 | 11/2015 |

OTHER PUBLICATIONS

PCT Invitation to Pay Additional Fees (Form ISA/206), RE: Application No. PCT/US2019/041966, dated Aug. 27, 2019.
(Continued)

*Primary Examiner* — Chenea Davis
(74) *Attorney, Agent, or Firm* — Panitch Schwarze Belisario & Nadel LLC

(57) ABSTRACT

This disclosure provides a system by which content/service providers can enable gaze-responsive advertisement/targeted content mechanisms for CPE devices like STB's/OTT streaming devices or systems or display devices. The system creates a new opportunity for content/service providers to advertise and helps in generating revenue. The system leverages using gaze-based technology in CPE devices like STB's or large display devices. A gaze-based algorithm helps the CPE devices to locate the viewer point of attention, using which gaze-responsive advertisement/content targeting can be achieved. The disclosure provides an end to end solution—from content creation to content consumption for gaze-responsive advertisement/media delivery.

18 Claims, 6 Drawing Sheets

(51) Int. Cl.
*H04N 21/442* (2011.01)
*H04N 21/81* (2011.01)

(56) References Cited

U.S. PATENT DOCUMENTS

| | | | | |
|---|---|---|---|---|
| 2005/0068992 | A1* | 3/2005 | Kaku | H04N 21/47202 |
| | | | | 375/E7.021 |
| 2010/0295774 | A1 | 11/2010 | Hennessey | |
| 2011/0305394 | A1* | 12/2011 | Singer | G06K 9/46 |
| | | | | 382/190 |
| 2012/0146891 | A1* | 6/2012 | Kalinli | H04N 19/115 |
| | | | | 345/156 |
| 2013/0212606 | A1* | 8/2013 | Kannan | H04N 21/251 |
| | | | | 725/12 |
| 2014/0245335 | A1* | 8/2014 | Holden | H04N 21/44218 |
| | | | | 725/12 |
| 2015/0245103 | A1* | 8/2015 | Conte | G06Q 30/0643 |
| | | | | 725/60 |
| 2016/0012475 | A1* | 1/2016 | Liu | G06Q 30/0251 |
| | | | | 705/14.49 |
| 2016/0295255 | A1* | 10/2016 | Steelberg | H04N 21/812 |
| 2017/0060370 | A1* | 3/2017 | Ahn | G06F 3/013 |
| 2018/0288477 | A1* | 10/2018 | Gupta | H04N 21/434 |

OTHER PUBLICATIONS

Communication pursuant to Article 94(3) EPC, dated Jun. 26, 2023, issued in corresponding European Application No. 19745948.0-1208, 9 pgs.

* cited by examiner

GAZE-RESPONSIVE ADVERTISEMENT

CROSS REFERENCE TO PROVISIONAL APPLICATION

This application claims priority under 35 U.S.C. § 119(e) from earlier filed U.S. Provisional Application Ser. No. 62/698,741, filed on Jul. 16, 2018 and is incorporated herein by reference in its entirety.

FIELD OF THE INVENTION

The present embodiments relate generally to human-machine interfaces, and specifically to interfaces that combine multiple user interaction modalities. This disclosure provides new methods by which content or service provider can use gaze-based technology for advertisement and related targeted or associated multimedia content.

The embodiments disclosed herein relate to attentive user interfaces for improving communication between humans and devices. More particularly, this invention relates to use of eye contact/gaze direction information by technological devices and appliances to more effectively communicate with users, in device or subject initiated communications.

Terminology

The following acronyms are used in this disclosure:

| | |
|---|---|
| STB | Set top box |
| AOI | Area of Interest |
| SEI | Supplemental Enhancement Information |
| STB | Set-Top Box |
| CPE | Consumer Premises Equipment |
| MPEG | Motion Pictures Expert Group |
| AVC | Advanced Video Codec |
| NAL | Network Abstraction Layer |

BACKGROUND

Interaction with technological devices is becoming an ever-increasing part of everyday life. However, effectiveness and efficiency of such interaction is generally lacking. In particular, when seeking user input, devices such as computers, cellular telephones and personal digital assistants (PDAs) are often disruptive, because such devices cannot assess the user's current interest or focus of attention. More efficient, user-friendly interaction is desirable in interactions with household appliances and electronic equipment, computers, and digital devices.

One way that human-device interactions can be improved is by employing user input such as voice and/or eye contact, movement, or position to allow users to control the device. Many previous attempts relate to controlling computer functions by tracking eye gaze direction. For example, teachings for systems for controlling a cursor on a computer screen based on user eye gaze direction or to controlling information transfer, downloading, and scrolling on a computer based on the direction of a user's eye gaze relative to portions of the computer screen.

Use of eye information for interaction with devices other than computers is less common. Some systems teach activation of a keypad for a security system, also using an eye tracker while other systems employ detection of direct eye contact. While it is evident that considerable effort has been directed to improving user-initiated communications, little work has been done to improve device-initiated interactions or communications.

Normally advertisements or associated media (banner, PPV alert, ticker) will be broadcasted on time slots for CPE devices without viewer interaction. There are no viewer gaze-responsive advertisement/media delivery mechanism available for CPE devices like set top boxes or over the top devices (STB's/OTT).

Currently the gaze-responsive advertisement/media delivery mechanisms are available for computer displays. In the available mechanisms, the area of interest needs to be always fixed. In case of active video sequence, it cannot be expected that the advertised object/items always remain in fixed location. So, these mechanisms cannot be directly applied for larger display devices.

Thus, there is a need for methods by which content or service providers can use gaze-based technology for advertisement and related targeted or associated multimedia content.

Popular methods for gaze detection algorithms include open source open source gaze detection algorithm and head pose estimation using OpenCV and Dlib.

This opensource algorithm for gaze detection can provide 95% accuracy in gaze detection. Eye Recognition techniques based on Eigen eyes methods are also popular.

SUMMARY

An embodiment includes an apparatus comprising an IP camera configured to continuously capture an image associated with a viewer, a receiver, a gaze processor to identify view-gaze coordinates and gaze direction and determining the viewer attention area, media content comprising a collection of gaze metadata, a gaze metadata parser to parse the collection of gaze metadata; and a gaze ad module to derive an area of interest (AOI) based on the collection of meta data. The AOI is compared to the viewer's attention area in order to select a gaze ad URL for display to the viewer. The gaze advertisement module sends data to an advertisement server. The gaze advertisement module data can be a gaze ad URL and is sent to an advertisement server. The gaze advertisement module gets the ad video content from advertisement server that will be shown to user. In one embodiment, the apparatus is a set top box. In another embodiment, the apparatus is a large display device. In yet another embodiment, the apparatus is a streaming device.

In another embodiment, the gaze metadata comprises (x,y) coordinates for each advertisable item, quadrant info, an advertisement URL for each advertisable item, a time frame for each advertisable item, and a video source resolution to which the (x,y) coordinates are relative.

Another embodiment includes a system for creating gazed-based advertising content, the system comprising, an incoming video stream, an image processing module identification module to receive the incoming video stream and identify advertisable items in a frame and provide a list of bitmaps for the advertisable items, an advertisement library comprising a list of advertisable items and a corresponding URL to each advertisable item, wherein the advertisable items are in a bitmap format, an ad mapper configured to compare the bit maps from the image processing module to the bitmaps from the advertisement library in order to provide the URL for the advertisable item; and an image processing module to provide the advertisable item coordinates and URL associated for advertisement to an advertisement server.

One method to insert advertisement data based on a user's gaze location comprises detecting a face associated with a viewer, extracting select facial features of the face of the viewer, using a gaze detection algorithm to determine (x,y) coordinates of the viewer attention on a display device, receiving, from a gaze meta data parser, gaze metadata comprising (x,y) coordinates representing an advertisable item, receiving a video format, calculating using the (x,y) coordinates and the video format, an Area of Interest AOI corresponding to the advertisable item, comparing the AOI with the (x,y) coordinates of the viewer attention, and if the AOI matches the viewer attention, select an advertisement URL and render the advertisement.

In one embodiment, the method further comprises a pre-determined time threshold during the which the comparing the AOI with the (x,y) coordinates of the viewer attention is considered valid.

In yet another embodiment, a method for gaze advertisement comprises detecting a face associated with a viewer, extracting select facial features of the face of the viewer, using a gaze detection algorithm to determine (x,y) coordinates of the viewer attention on a display device, receiving a video format, receiving, from a gaze meta data parser, gaze metadata comprising the number of quadrants into which a video frame is divided, calculating using the meta data, the quadrant corresponding to the advertisable item, determining if the (x,y) coordinates of the viewer's attention to the display corresponds to the quadrant of the advertisable items. If the coordinates fall on the quadrant, an advertisement URL is selected, and then the advertisement is rendered.

In an embodiment, the method further comprises a pre-determined time threshold during the which the determining if the (x,y) coordinates of the viewer's attention to the display corresponds to the quadrant of the advertisable items is valid.

Yet another embodiment comprises capturing, using an IP camera, an image of at least one face associated with a respective viewer, detecting, by the image processor, a gaze direction of the at least one viewer, wherein the detection of the gaze is determined by head pose estimation methods, receiving a video stream into a gaze metadata parser comprising gaze metadata, determining if the metadata contains if advertisable item is present in the left half of the frame or the right half of the frame, determining if the viewer's gaze direction with respect to the display corresponds to the determined half of the frame which comprises the advertisable item; and if the gaze direction corresponds to the half of the frame which comprises the advertisable item, then render the advertisement.

One method further comprises a pre-determined time threshold during the which determining if the viewer's gaze direction with respect to the display corresponds to the determined half of the frame which comprises the advertisable items is valid.

In certain embodiments, gaze metadata comprises (x,y) coordinates for each advertisable item, quadrant information, an advertisement URL for each advertisable item, a time frame for each advertisable item, and a video source resolution to which the (x,y) coordinates are relative.

BRIEF DESCRIPTION OF THE DRAWINGS

The disclosure is herein described, by way of example only, with reference to the accompanying drawings, wherein.

DETAILED DESCRIPTION

This disclosure provides methods and apparatus by which content/service providers can enable gaze-responsive advertisement/targeted content mechanisms for CPE devices such as STB's/OTT streaming devices or systems or display devices. This disclosure creates new opportunity for content/service provider to advertise and helps in generating revenue.

Embodiments disclosed herein leverage using gaze-based technology in CPE devices like STB's or large display devices. The gaze-based algorithm can assist the CPE devices to locate the viewer point of attention, using which gaze-responsive advertisement/content targeting can be achieved. The disclosed embodiments herein provide end-to-end solutions—from content creation to content consumption for gaze-responsive advertisement/media delivery.

At the content distribution site, the gaze sensitive data is inserted—for example (x,y) co-ordinates/frame quadrant in the media. This data helps the display device to identify the targeted media.

At the content consumption site, the CPE device uses available gaze detection algorithm(s), maps the viewers gaze to the corresponding targeted media and subsequently selects/presents the targeted media.

Eye-gaze detection and tracking have been an active research field in the past years as it adds convenience to a variety of applications. It is a significant untraditional method of human computer interaction. Head movement detection has also received attention and interest as it has been found to be a simple and effective interaction method. These serve a wide range of functions. For both eye tracking and head movement detection, several different approaches are used to implement different algorithms for these technologies.

Figure 1:
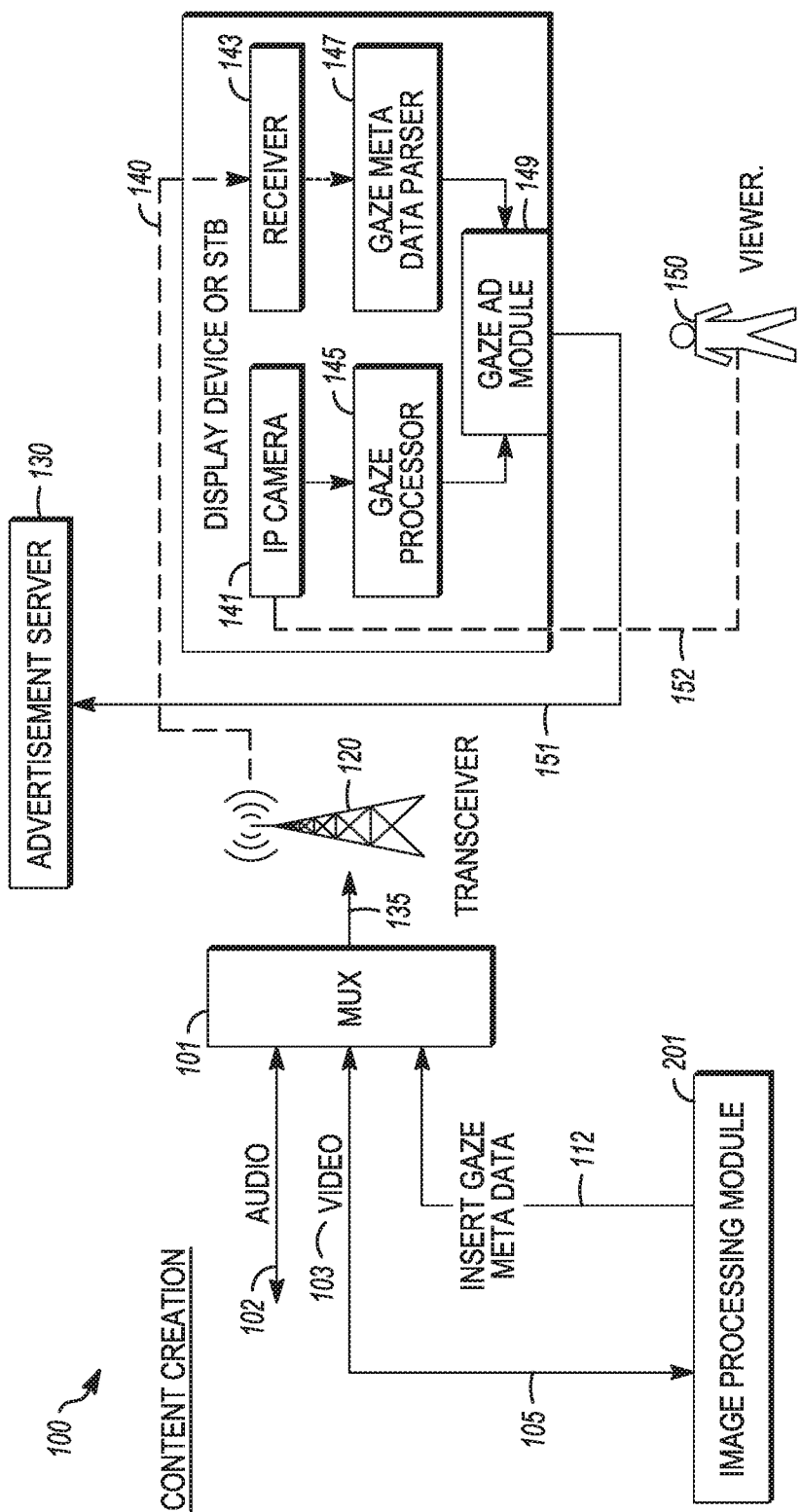
FIG. 1 is a block diagram 100 that schematically illustrates the functional components of the system implementing the user interface in accordance with an embodiment of the present invention.

FIG. 1 is a block diagram 100 that schematically illustrates the functional components of the system implementing the user interface in accordance with an embodiment of the present invention. Multiplexer (MUX) 101 receives audio input 102 from an external source. MUX 101 also receives video input 103 from an external source. The Video Multiplexer tool embeds geospatial information from a metadata file to a video to produce a geo-enabled video file, which can be visualized and used for data capture in the Full Motion Video (FMV) player. With the proper metadata, users can display the video footprint, sensor location, and look angle on a map as they plays the video. After processing, MUX 101 outputs video stream 105 to an Image Processing Module 201. After processing, the Image Processing Module 201 sends signal 112 back to the MUX 101 which then outputs a stream 135 to transmitter 120.

Signal 135 is then transmitted to display device 140. Display device 140 can be a set top box. Set top box 140 comprises a receiver 143, IP camera 141 to detect the gaze 152 of viewer 150, gaze processor 145, gaze meta data parser 147 and gaze ad module 149. The output 151 from display box 140 is sent to advertisement server 130. The gaze advertisement module 149 sends data 151 to an advertisement server 130. The gaze advertisement module data 151 can be a gaze ad URL and is sent to an advertisement server 130. The gaze advertisement module 149 gets the advertisement video content from advertisement server that will be shown to user 150. In one embodiment, the apparatus is a set top box. In another embodiment, the apparatus is a large display device. In yet another embodiment, the apparatus is a streaming device.

In all flowcharts, a reasonable time threshold is used to match viewer's gaze data with the AOI provided by gaze metadata, to avoid false positive matches, when deciding to select/play the advertisement.

Figure 2:
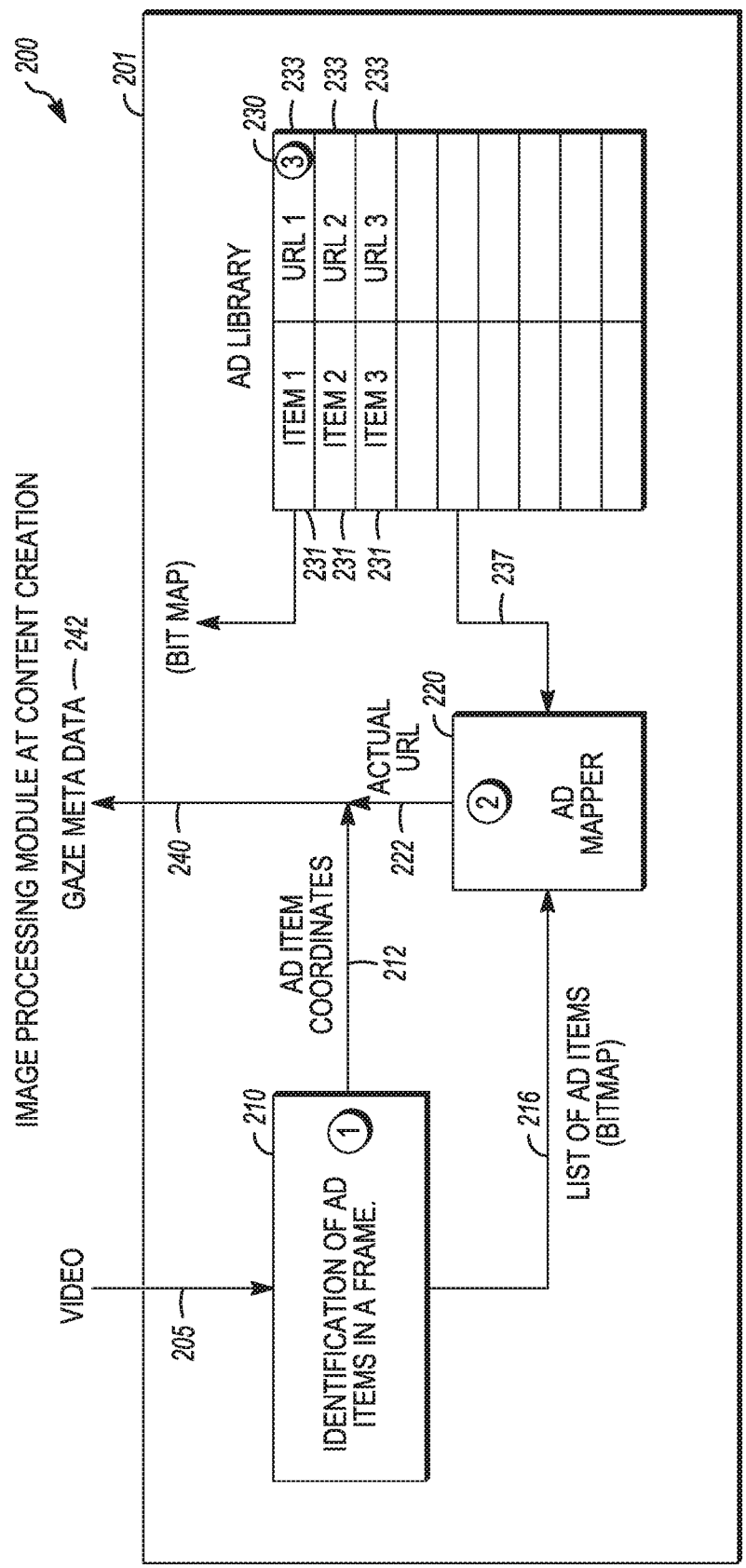
FIG. 2 is another block diagram 200 that schematically illustrates the functional components of the image process module at content creation, in accordance with an embodiment of the present invention.

FIG. 2 is a block diagram 200 that schematically illustrates the functional components of the system implementing the user interface in accordance with an embodiment of the present invention. Block diagram 200 illustrates the Process Module at content creation. Image processing module 201 comprises an identification module 210 which is configured to determine the identification of advertising items into a frame. Module 210 accepts video input 205 and provides a list of bit maps 216 corresponding to each advertising item.

An advertising library 230 comprises a bit map list of items 231 and their corresponding URL 233. The advertising library 230 and the module 210 provide input 327 and 216 respectively to Ad Mapper 220. The ad mapper 220 compares the bit map in input 216 to the bit map in input 237 and provides the URL for the advertising item.

Ad Mapper 220 output 240 comprises gaze meta data 242 which comprises the URL stream 222 as well as ad item coordinates 212. The advertising library can be managed by the service provider.

Block diagram FIG. 2 illustrates an embodiment for gaze metadata insertion; however, how advertisable objects are identified is out of scope of invention. How advertisable objects are identified can be done by content creators or service providers, either manually or using some tools. In FIG. 2, the URL provided by Ad mapper for specific ad item, is a generic URL that will be understood by Ad server. At the time of ad content download in the display device (TV/STB), the Ad server will provide the content relevant at that point of time. This avoids changing the stream that is transmitted from the content creation/transmission end.

In gaze metadata insertion methods described herein, the gaze metadata can have following details:
X,Y Co-ordinates for each Ad object (Or Quadrant info)
AD URL for each Ad object (Video URL, Ad Poster URL)
Time frame for each Ad object
Video Source resolution (for which X, Y co-ordinates are relative to)
In all scenarios, a reasonable time threshold is used to match viewer's gaze data with the AOI provided by gaze metadata, to avoid false positive matches, when deciding to select/play the advertisement.

Figure 3:
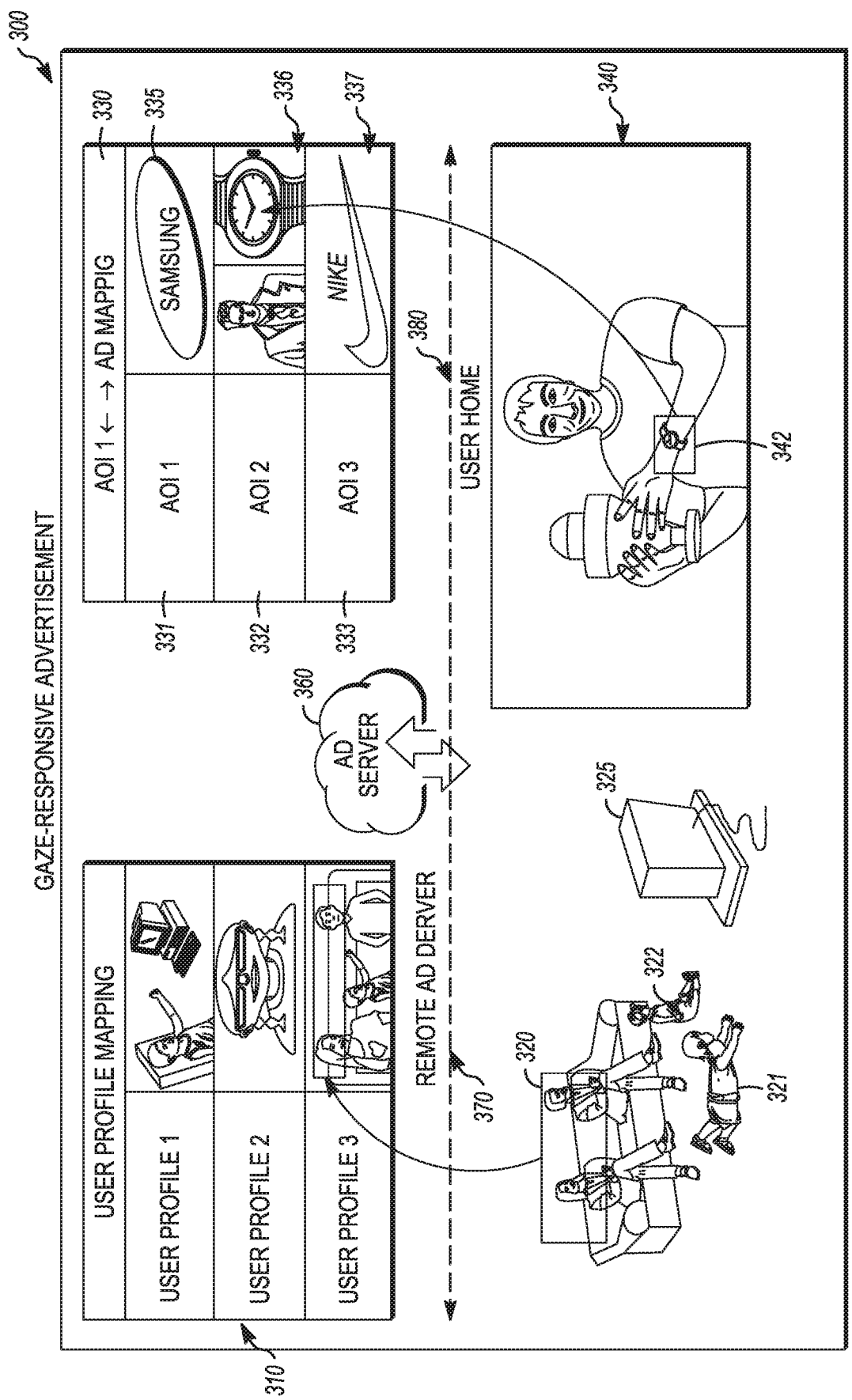
FIG. 3 is an illustration of the system described in the FIGS. 1-2 and 4-6 in a live environment.

FIG. 3 is an illustration of a system 300 as also shown in FIGS. 1 and 2 in an example home setting 380. In setting 300, users 320, 321, and 322 are interacting with a device 325, for example, watching a television showing content or programming 340 supplied, for example, via a set top box or other consumer premises equipment (CPE).

As shown in FIGS. 1, 2 and 4-6, a camera located in the CPE is used to capture gaze data associated with each viewer and used to determine the gaze profile of each user. A remote ad server 360 comprises user profile mapping 310 and AOI to ad mapping 330 capabilities. The user profile mappings of the ad server 360 are shown in table 310. These mappings show the profiles for each user based on each user's gaze mapping. In this example, the area of interest (AOI) in the programming current to the users, is the wristwatch 342 on the wrist of the man displayed on the screen of television 325. Module 330 stores the various areas of interest (AOIs) 331, 332, 333 with URLs 335, 336, 337 to corresponding advertising.

In this example, the wrist watch 342 shown in the programming 340 matches the entry in the table 330 to AOI 2 332 which corresponds to the URL 336 to advertising of the targeted product (in this case the wrist watch 342). The advertising server 360 receives the information about the desired advertisement related to AOI 332 and its URL 336 and renders the advertisement content to be inserted into the programming content 340 shown on the viewer device 325.

Figure 4:
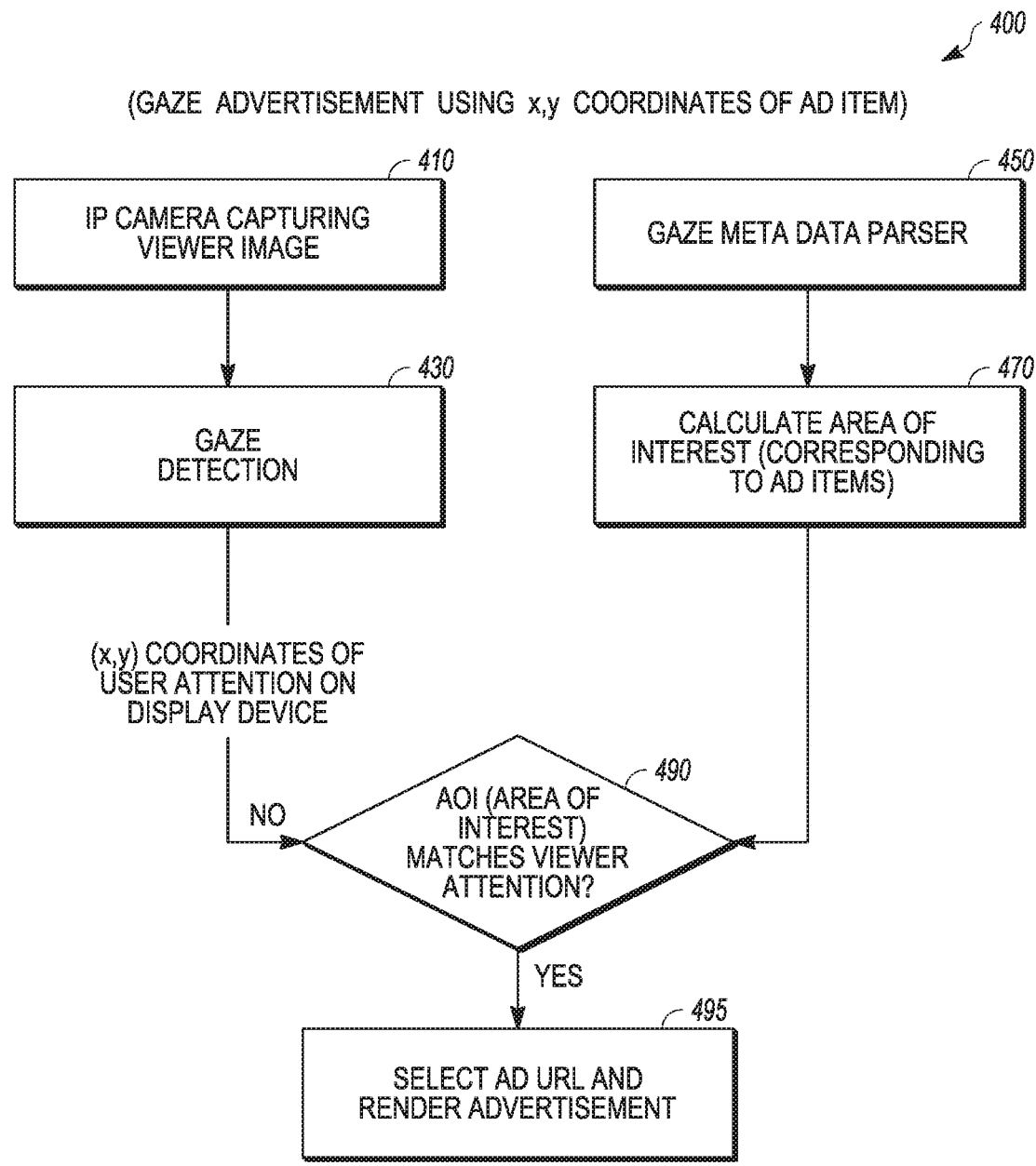
FIG. 4 is a flow diagram that schematically illustrates a method of detecting a direction of a gaze of a user, in accordance with an embodiment of the present invention.

The method shown in FIG. 4 illustrates a method 400 for gaze advertising using the (x,y) coordinates of the advertising item. Beginning at step 410, the IP camera captures the viewer's image. At step 430 gaze detection is accomplished. At step 430 the (x,y) coordinates of a user attention on the display device is output. At step 450, a gaze meta data parser parses the data. The data here refers to media content (video stream) that contains the gaze meta data inserted at content distribution end. The gaze metadata parser receives gaze meta data from the media content (different embodiments to how gaze metadata can be part of the media content are later disclosed).

At step 470 an area of interest (AOI) is calculated. The area of interest corresponds to the advertising items. At decision 490, the area of interest is compared to the (x,y) coordinate to see if it matches the viewer attention. If yes, at step 495, the method then moves to select the advertising URL and render the advertisement.

Figure 5:
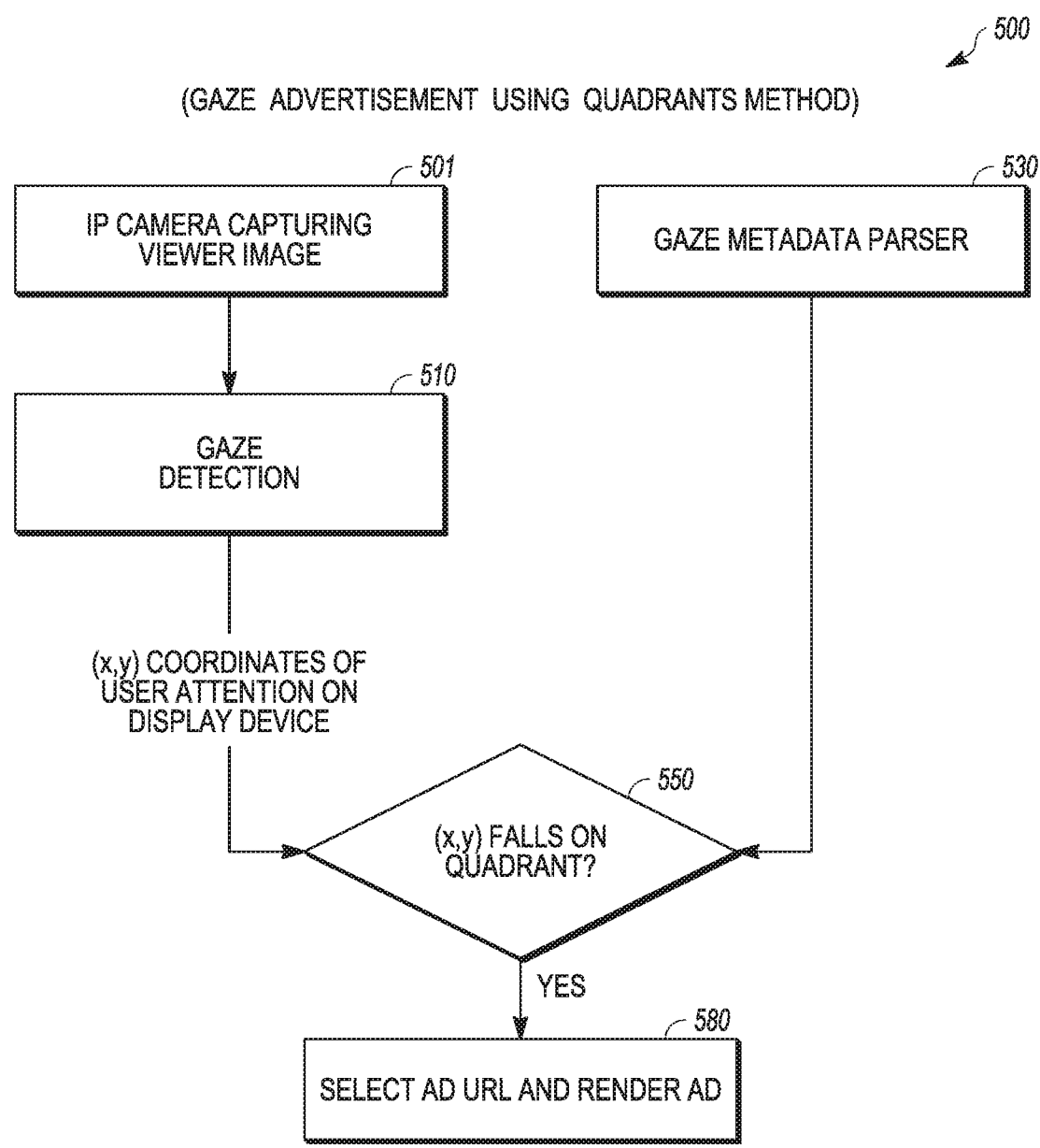
FIG. 5 is a flow diagram that schematically illustrates a method of detecting a direction of a gaze of a user, in accordance with an embodiment of the present invention.

FIG. 5 illustrates a method 500 for gaze advertisement using a quadrant method. Beginning at step 501, the IP camera captures the viewer image. At step 510 gaze detection is accomplished via a method referred to herein. After gaze detection is accomplished, at step 510 the (x,y) coordinates of the user attention on the display device are output. Module 510 outputs the (x,y) coordinates of user attention on the display device. At step 530, a gaze meta data parser parses the data related to the user's gaze. In this method, metadata should contain the number of quadrants into which the frame is divided.

At decision step 550, the (x,y) coordinate of the viewer attention is compared to see if it falls on a quadrant, and which one. If yes, at step 580, the advertising URL is selected and the advertisement is rendered for insertion into the viewer's programming.

In all flowcharts depicting methods herein, a reasonable time threshold is used to match viewer's gaze data with the AOI provided by gaze metadata, to avoid false positive matches, when deciding to select/play the Ad.

Figure 6:
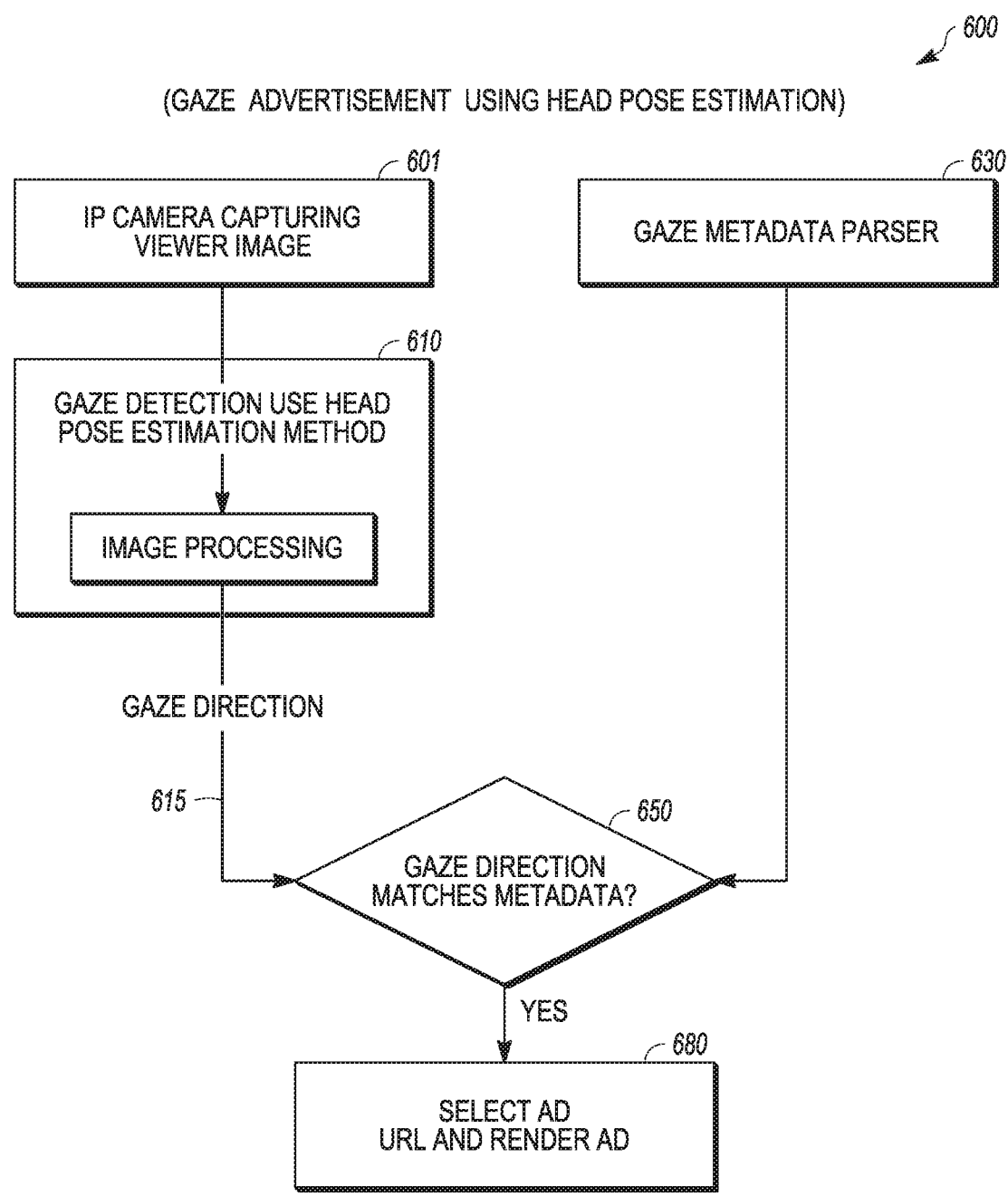
FIG. 6 is a flow diagram that schematically illustrates a method of detecting a direction of a gaze of a user, in accordance with an embodiment of the present invention.

The process in FIG. 6 depicts a method 600 for gaze advertising using head pose estimation. The increased popularity of the wide range of applications of which head movement detection is a part, have increased the size of research aiming to provide robust and effective techniques of real-time head movement detection and tracking. The field of real-time head movement detection has received much attention from researchers. There are many different approaches for head pose estimation. In a machine, such as a computer, vision, the pose of an object refers to its relative orientation and position with respect to a camera. The pose can change by either moving the object with respect to the camera, or the camera with respect to the object.

The pose estimation disclosed can be one of many methods and is outside of the scope of the disclosed embodiments. The goal is to find the pose of a viewer when there is a calibrated camera, as shown in the figures, and, for example, the locations of n 3D points on the object and the corresponding 2D projections in the image are known or can be ascertained.

Beginning at step 601, the IP camera captures the viewer image. At step 610 gaze detection is accomplished using image processing that uses the head pose estimation method. At step 610 the gaze direction 615 is output. At step 630, a gaze meta data parser parses the data related to the user's gaze direction. In this method, metadata contains information that is used to determine whether the advertisement is present in the left or right half of the frame.

At decision step 650, the gaze direction is compared to the meta data for a match. If there is a match, the method advances to step 680, and the corresponding advertising URL is selected, and the advertisement content is rendered.

Gaze Processing Algorithms

As disclosed and further expounded upon above in the figures, gaze responsive advertisement for larger display needs are disclosed. In such embodiments, content providers and/or service providers insert gaze-related information as meta-data, such as the location of the object/item that needs to be advertised in the video frame, using which the display device can identify the advertised item or object. The display device/STB, as described above, will parse the gaze meta-data. Using the gaze-meta data, the display device can calculate the area of interest (AOI).

The IP camera-enabled display device/STB can contain gaze processor which can help the display device to identify the viewers point of attention. If the viewers point of attention matches with AOI derived from gaze meta data, the display device/STB can tune to the advertisement present in advertisement server.

Insertion of Gaze Data

In the disclosed embodiments, the content provider or service provider can add the gaze data in any preferred method. The gaze data comprises different types of meta data. The Gaze meta data comprises one or more of the following types of data:
   a. (x,y) Co-ordinates, height and width of the object that needs to advertised. Using this information, the display device can derive the AOI.
   b. The source resolution of the video frame. Using this information, the display device can scale the AOI before trying to map viewers point of attention.
   c. The advertisement URL of the advertisement present in the advertisement server.

This URL can be used by a display device/STB to select an advertisement.

The gaze detecting processing can be simplified by several methods. One of the methods to make the gaze detection simpler for the display device is to utilize quadrant data. In this method, instead of using (x,y) co-ordinates along with height and width, the service/content provider can indicate the quadrant where the advertised object is present in the video frame. One embodiment using this method could be that the video frame is divided into four (4) quadrants and the content/service provider can indicate in which quadrant (1, 2, 3, or 4) the advertised object is present.

To identify the AOI using the gaze-data mentioned above, a display device needs a complex gaze detection algorithm to identify the accurate co-ordinates of a viewer's eye attention on a display screen. Detecting the orientation of a viewer's face can be much easier compared to detecting the exact location of a viewer's' attention on display screen. Detecting the orientation of a viewer's face can utilize a less complex algorithm compared to detecting the accurate gaze co-ordinates of a viewer's face.

To ease the complexity of gaze detection algorithm on display device, the disclosed embodiments use different set of gaze-data. This set of gaze-data comprises:
   a. JPEG image URL—the image that is targeted to be displayed on display device.
   b. Direction: Indicates the display device where it needs to display the JPEG image. The Direction can be LEFT or RIGHT. If Direction is LEFT, the display device should present the JPEG poster on the left side of the screen. When this direction matches with the orientation of viewer's face detected by gaze-detection algorithm, then display device should select the advertisement.
   c. Advertisement URL. —Location of the advertisement.
   d. Duration: Indicates the amount of time the display device should display the JPEG image.
   e. AdTriggerDuration: This data is optional and indicates minimum of amount of time the viewer should gaze at the poster consistently after which advertisement can be presented.

The gaze meta data can be part of SEI NAL of H264/AVC or can be part of separate data PID in MPEG2 Transport system or can be part of meta data WebVTT.

An example WebVTT for gaze meta data comprises:

```
WEBVTT
VTTKind: metadata
VTTDataFormat: JSON
VTTDataHint: Eye-Gaze Data
With the payload of each cue being the JSON itself.
The sample payload of JSON object can be
00:00.000 --> 00:01.000
{
    "X-CoOrdinate":720,
    "Y-Coordinate": 1280,
    "Height": 200
    "Width":250
    "Source Resolution": 1080p
    "Advertisement Url": "http://10.232.72.84/Eye -Gaze/Rolex.mp4"
}
```

Gaze Processing in the CPE Devices

The CPE device can contain a wide-angle IP camera which can be configured to capture the viewers face and feed these frames to the gaze processor.

The gaze processor can comprise the following features:

The CPE devices can have image processing capability which can process the frames captured by the IP camera and detect the viewers' attention.

Open source image processing libraries like OpenCV, Dlib are available which can be used to implement the gaze detection Gaze detection algorithm can be a complex algorithm which could derive the exact location (x,y) co-ordinates at which viewers eyes are gazing.

To simplify the gaze detection, in some embodiments, a much easier gaze algorithm can be used to just provide information related to viewer head pose and orientation.

Based on the image processor complexity and CPE device configuration, multi-viewers scenario can be considered by which targeted advertisement can be achieved.

The CPE device can parse the gaze-meta data present in the content and calculate the area of interest.

If viewers' attention obtained by the gaze detection algorithm matches with the area of interest calculated using the gaze-meta data, then advertisement will be displayed.

Gaze user profile: If there are multiple viewers, the gaze processing algorithm can use face detection and determine a profile that has to be used in advertisement selection. There could be multiple profiles defined, depending on the combination of viewers. Also, there can be a priority mechanism in choosing the viewer, when multiple viewers are present, when doing the gaze processing.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Although the subject matter has been described in language specific to structural features and/or methodological acts, it is to be understood that the subject matter defined in the appended claims is not necessarily limited to the specific features or acts described above.

We claim:

1. An apparatus comprising:
a gaze processor to receive a continuous image associated with a viewer;
a receiver to receive media content, the media content including gaze metadata associated with one or more advertisable items in the media content, the gaze metadata including (x,y) coordinates and a URL for each of the one or more advertisable items;
the gaze processor configured to determine a viewer attention area by identifying view-gaze coordinates and a gaze direction of the viewer;
a gaze metadata parser to parse the gaze metadata; and
a gaze advertisement module to:
derive an area of interest (AOI) in the media content based on the gaze metadata, the AOI corresponding to one of the one or more advertisable items;
determine the AOI matches the viewer attention area;
select an advertisement URL for the advertisable item corresponding to the AOI;
send the advertisement URL to an advertisement server;
receive an advertisement corresponding to the advertisement URL; and
present the advertisement associated with the advertisement URL within the media content via a display.

2. The apparatus of claim 1, wherein the apparatus is a set top box.

3. The apparatus of claim 1, wherein the apparatus is a large display device.

4. The apparatus of claim 1, wherein the apparatus is a streaming device.

5. The apparatus of claim 1, wherein the gaze metadata further includes quadrant info, and an advertisement URL for each of the one or more advertisable items, a time frame for each of the one or more advertisable items, and a video source resolution to which the (x,y) coordinates are relative.

6. A system for creating gazed-based advertising content, the system comprising:
a multiplexer (MUX) configured to:
receive an audio input and a video input;
generate a video stream using the audio input and the video input;
transmit the video stream to an image processing module;
the image processing module including:
a receiver to receive the video stream;
an identification module to identify at least one advertisable item in a frame of the video stream and provide a list of bitmaps for the at least one advertisable item;
an advertisement library to store a list of advertisable items including the at least one advertisable item and a corresponding URL to each advertisable item, wherein the advertisable items are in a bitmap format;
an ad mapper configured to:
provide a URL associated with the at least one advertisable item by comparing the identified bitmaps of the at least one advertisable item to the bitmaps from the advertisement library;
a transmitter to output the video stream to the MUX, the video stream including gaze metadata associated with the at least one advertisable item, the gaze metadata including the URL associated with the at least one advertisable item and bitmap coordinates for the at least one advertisable item, the bitmap coordinates comprising (x,y) coordinates;
the MUX further configured to:
transmit the video stream to a display device;
the display device configured to:
receive the video stream;
continuously detect a face associated with a viewer;
extract select facial features of the face of the viewer;
use a gaze detection algorithm to determine (x,y) coordinates of the viewer attention on a display device;

receive, from a gaze meta data parser, gaze metadata comprising (x,y) coordinates representing an advertisable item;
calculate an area of interest (AOI) corresponding to the advertisable item using the (x,y) coordinates representing the advertisable item and the video stream;
compare the AOI with the (x,y) coordinates of the viewer attention;
determine the AOI matches the (x,y) coordinates of the viewer attention;
select an advertisement URL associated with the advertisable item;
send the advertisement URL to the image processing module;
receive an advertisement corresponding to the advertisement URL; and
present the advertisement associated with the advertisement URL within the video stream.

7. A method to insert advertisement data based on a user's gaze location, the method comprising:
continuously detecting a face associated with a viewer;
extracting select facial features of the face of the viewer;
using a gaze detection algorithm to determine (x,y) coordinates of the viewer attention on a display device;
receiving, from a gaze meta data parser, gaze metadata comprising (x,y) coordinates representing an advertisable item;
receiving a video format;
calculating an area of interest (AOI) corresponding to the advertisable item using the (x,y) coordinates representing the advertisable item and the video format;
comparing the AOI with the (x,y) coordinates of the viewer attention;
determining the AOI matches the (x,y) coordinates of the viewer attention;
selecting an advertisement URL associated with the advertisable item;
sending the advertisement URL to an advertisement server;
receiving and advertisement corresponding to the advertisement URL; and
presenting the advertisement associated with the advertisement URL within the video format.

8. The method of claim 7, wherein the method further comprises a pre-determined time threshold during which the comparing the AOI with the (x,y) coordinates of the viewer attention is considered valid.

9. The method of claim 7, wherein the gaze metadata comprises (x,y) coordinates for each advertisable item, quadrant information, an advertisement URL for each advertisable item, a time frame for each advertisable item, and a video source resolution to which the (x,y) coordinates are relative.

10. A method for gaze advertisement, the method comprising:
continuously detecting a face associated with a viewer;
extracting select facial features of the face of the viewer;
using a gaze detection algorithm to determine (x,y) coordinates of the viewer attention on a display device,
receiving a video format;
receiving, from a gaze meta data parser, gaze metadata associated with one or more advertisable items in the media content, the gaze metadata including a number of quadrants into which a video frame is divided and (x,y) coordinates for the one or more advertisable items;
calculating using the metadata, a quadrant of the number of quadrants corresponding to the location of an advertisable item;
determining which quadrant of the number of quadrants corresponds to the (x,y) coordinates of the viewer's attention to the display;
selecting an advertisement URL;
sending the advertisement URL to an advertisement server;
receiving an advertisement corresponding to the advertisement URL; and
presenting the advertisement associated with the advertisement URL within the video format in the quadrant corresponding to the (x,y) coordinates of the viewer's attention.

11. The method of claim 10, wherein the determining which quadrant corresponds to the (x,y) coordinates of the viewer's attention to the display includes a pre-determined time threshold during which the determining is valid.

12. The method of claim 10, wherein the gaze metadata further includes quadrant information, an advertisement URL for each of the one or more advertisable items, a time frame for each of the one or more advertisable items, and a video source resolution to which the (x,y) coordinates are relative.

13. A method for gaze advertisement insertion, the method comprising:
continuously capturing, using an IP camera, an image of a face associated with at least one viewer;
detecting, by an image processor, a gaze direction of the at least one viewer, wherein the detection of the gaze is determined by head pose estimation methods;
receiving a video stream into a gaze metadata parser, wherein the video stream includes gaze metadata associated with one or more advertisable items in the video stream, the gaze metadata including (x,y) coordinates for the one or more advertisable items;
determining within the gaze metadata, if an advertisable item is present in the left half of the frame or the right half of the frame;
determining the viewer's gaze direction with respect to the display corresponds to the determined half of the frame which comprises the advertisable item;
selecting an advertisement URL;
sending the advertisement URL to an advertisement server;
receiving an advertisement corresponding to the advertisement URL; and
presenting the advertisement associated with the advertisement URL within the video stream on the half of the frame which comprises the advertisable item.

14. The method of claim 13, wherein the determining if the viewer's gaze direction with respect to the display corresponds to the determined half of the frame which includes a pre-determined time threshold during which the determining is valid.

15. The method of claim 13, wherein the gaze metadata further includes quadrant information, an advertisement URL for each of the plurality of advertisable items, a time frame for each of the plurality of advertisable items, and a video source resolution to which the (x,y) coordinates are relative.

16. The method of claim 7, wherein the detecting a face associated with a viewer includes:
identifying a gaze user profile associated with the viewer; and wherein selecting an advertisement URL associated with the advertisable item is based on the gaze user profile.

17. The method of claim 7, wherein the detecting a face associated with a viewer includes:
    detecting one or more faces associated with one or more viewers, each of the one or more faces associated with a gaze user profile, each gaze user profile including a priority ranking from a lowest priority to a highest priority;
    selecting the gaze user profile with the highest priority; and
    wherein selecting an advertisement URL associated with the advertisable item is based on the gaze user profile with the highest priority ranking.

18. The apparatus of claim 1, comprising:
    the gaze processor to determine a user profile associated with the viewer; and
    wherein selecting an advertisement URL associated with the advertisable item is based on the gaze user profile.

* * * * *